(12) United States Patent
Miao et al.

(10) Patent No.: US 10,740,997 B2
(45) Date of Patent: Aug. 11, 2020

(54) VALUABLE MEDIA SUBSTRATE VALIDATION

(71) Applicant: NCR Corporation, Duluth, GA (US)

(72) Inventors: Yun-Qian Miao, Waterloo (CA); Gary Alexander Ross, Midlothian (GB)

(73) Assignee: NCR Corporation, Atlanta, GA (US)

( * ) Notice: Subject to any disclaimer, the term of this patent is extended or adjusted under 35 U.S.C. 154(b) by 262 days.

(21) Appl. No.: 15/904,773

(22) Filed: Feb. 26, 2018

(65) Prior Publication Data

US 2019/0266827 A1   Aug. 29, 2019

(51) Int. Cl.
| | | |
|---|---|---|
| *G01N 21/00* | (2006.01) | |
| *G07D 7/121* | (2016.01) | |
| *G07D 7/128* | (2016.01) | |
| *G01N 21/31* | (2006.01) | |
| *G01N 21/59* | (2006.01) | |

(52) U.S. Cl.
CPC ............ *G07D 7/121* (2013.01); *G01N 21/31* (2013.01); *G01N 21/59* (2013.01); *G07D 7/128* (2013.01); *G07D 2207/00* (2013.01)

(58) Field of Classification Search
CPC .......... G06K 9/00577; G06K 2209/01; G06K 9/00288; G06K 9/00442; G07D 2207/00; G07D 2211/00; G07D 7/121; G07D 7/128; G01N 21/31; G01N 21/59
USPC ...................................................... 356/73.1
See application file for complete search history.

(56) References Cited

U.S. PATENT DOCUMENTS

| | | | | |
|---|---|---|---|---|
| 2008/0036193 A1* | 2/2008 | Golaire | ................. | B42D 25/45 283/67 |
| 2008/0123931 A1* | 5/2008 | He | ............................ | G06K 9/00 382/135 |
| 2008/0159614 A1* | 7/2008 | He | ......................... | G06K 9/6267 382/135 |
| 2009/0324053 A1* | 12/2009 | Ross | ....................... | G07D 7/206 382/137 |
| 2011/0239885 A1* | 10/2011 | Marchant | ................ | B42D 25/29 101/483 |
| 2015/0310268 A1* | 10/2015 | He | ......................... | G06K 9/6215 382/135 |
| 2016/0355693 A1* | 12/2016 | Grigorenko | ............. | B41M 3/148 |

* cited by examiner

*Primary Examiner* — Sunghee Y Gray
(74) *Attorney, Agent, or Firm* — Schwegman, Lundberg & Woessner

(57) ABSTRACT

Front side, reverse side, and transmissive images for a media item are obtained during a transaction at a transaction terminal wherein the media item is being processed by or urged through the transaction terminal during the transaction. A substrate image is derived from the front side, reverse side, and transmissive images. Features are extracted from the substrate image and compared against model features for a given type and a given denomination associated with the media item. A decision is made as to whether the media item is genuine or counterfeit based on the comparison between the extracted features and the model features, and the indication is provided to the transaction terminal during the transaction.

18 Claims, 9 Drawing Sheets

| Orientation | Metric | #Testnote | Original DVM | DVM with solution |
|---|---|---|---|---|
| A | Genuine acceptance | 721 | 97.64% | 99.86% |
| | Counterfeit category* | 35 | 8-sus, 27-cf | 35-cf |
| | Counterfeit max-value | | 2.39 | 2.0 |
| B | Genuine acceptance | 945 | 97.25% | 99.68% |
| | Counterfeit category | 40 | 7-sus, 33-cf | 40-cf |
| | Counterfeit max-value | | 2.77 | 2.0 |
| C | Genuine acceptance | 720 | 98.33% | 99.58% |
| | Counterfeit category | 32 | 10-sus, 22-cf | 32-cf |
| | Counterfeit max-value | | 2.75 | 2.0 |
| D | Genuine acceptance | 719 | 99.44% | 99.44% |
| | Counterfeit category | 35 | 8-sus, 27-cf | 35-cf |
| | Counterfeit max-value | | 2.58 | 2.0 |
| Overall | Genuine accept-rate | | 98.10% | 99.63% |
| | Counterfeit accept-rate | | 0.00% | 0.00% |
| | Counterfeit suspect-rate | | 23.24% | 0.00% |

FIG. 1H

VALUABLE MEDIA SUBSTRATE VALIDATION

BACKGROUND

Media handing devices process media documents and bunches of media documents after separating the media documents for individual processing downstream within the media handling devices. Media handing devices include a variety of integrated components. One type of media document is a banknote or currency note (note).

As the note is processed through the media handling device, a variety of sensors are activated and deactivated to track movement of the note and indicate where the note is located along the transport pathway.

Typically, track sensors or photodiode (emitter) and phototransistor pairs, located on the same or opposing sides of the document track are activated before and/or after media handling components for purposes of transmitting a presence of the note on the track as signals to integrated controllers within the media handling devices.

Depending on the location of a note along the pathway, other devices may be activated, such as a media validation module (device) located in a designated area along the pathway. The media validation module may include cameras, sensors (Infrared, Ultraviolet (UV), etc.) and Light Emitting Diodes (LEDs) that illuminate the face of the note to capture different characteristics of the note for purposes of determining whether the note is counterfeit (fake) or unfit in some manner (excessively damaged).

The security features of a note generally fall into two categories: those associated with the printing process and those resident in the substrate. In terms of automatic validation, it is an attainable task to examine the printing feature through multi-spectrum of imaging, but the validation of substrate feature is a long-standing challenge because there does not exist such an instrument capable of measuring the middle part of a media. Existing solutions rely mostly on transmissive images, but in a transmissive image the substrate signal is submerged by the rich information of the two-sided printing details.

The weakness in examining substrate features is an unignorable drawback to automatic banknote processing systems, which is exposed to the risk of accepting counterfeits. One challenge of these test notes is their printing features are perfectly reproduced whereas some substrate features are omitted.

SUMMARY

In various embodiments, methods and a valuable media depository are provided for valuable media substrate validation.

According to an embodiment, a method for valuable media substrate validation processing is presented. Specifically, and in one embodiment, a first image and a second image of the media item are obtained. A transmissive image of the media item is acquired. A substrate image is derived from the first image, the second image, and the transmissive image. Finally, an indication is provided as to whether the media item is genuine or counterfeit based on a comparison of the substrate image to a model substrate image for the media item.

BRIEF DESCRIPTION OF THE DRAWINGS

FIG. 1H depicts a table of results for testing the valuable media substrate validation techniques, according to an example embodiment.

DETAILED DESCRIPTION

As will be discussed more completely herein and below with the various embodiments presented, a three-layer 'sandwich' formation processing technique is presented for purposes of modeling a media item and extracting substrate signals derived from multilayer optical transmissive equations. This technique provides a solution for solving substrate validation issues (as mentioned above), such that the input of substrate signals lead to easily distinguishing imitations (counterfeit media items) either in the form of having printing features but missing substrate features, or vice versa. Such is of utmost importance in the industry given the improved printing quality being produced by counterfeiters.

Figure 1A:
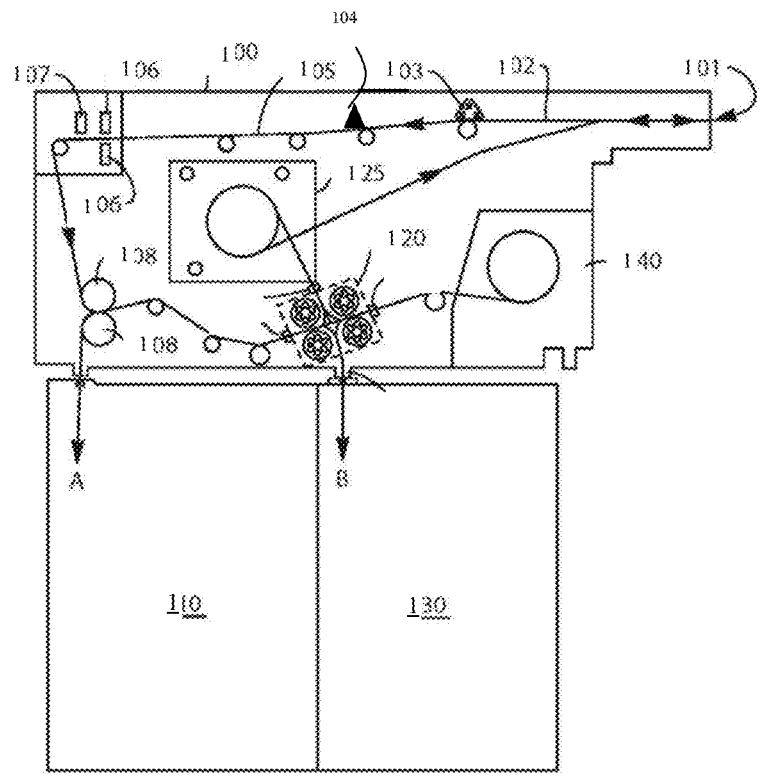
FIG. 1A is a diagram depicting a deposit module of a Self-Service Terminal (SST) having a media validation device (module), according to an example embodiment.

FIG. 1A is a diagram depicting a deposit module of a Self-Service Terminal (SST) having a media validation device (module), according to an example embodiment. It is to be noted that the valuable media depository is shown with only those components relevant to understanding what has been added and modified to a conventional depository for purposes of providing valuable media substrate validation within one or more imaging devices or modules integrated within the depository 100.

The depository 100 is suitable for use within an Automated Teller Machine (ATM), which can be utilized to process deposited banknotes and checks (valuable media as a mixed bunch if desired). The deposit module 100 has an access mouth 101 (media or document infeed) through which incoming checks and/or banknotes are deposited or outgoing checks and/or banknotes are dispensed. This mouth 101 is aligned with an infeed aperture in the fascia of the ATM in which the depository 100 is located, which thus provides an input/output slot to the customer. A bunch (stack) of one or more items (valuable media) is input or output. Incoming checks and/or banknotes follow a first transport path 102 away from the mouth 101 in a substantially horizontal direction from right to left shown in the FIG. 1A. They then pass through a separator module 103 and from the separator 103 to a deskew module 104 along another pathway portion 105, which is also substantially horizontal and right to left. The items are now de-skewed and aligned for reading by imaging cameras 106 and a Magnetic Ink Character Recognition (MICR) reader 107 by a media validation module (comprising the cameras 106 and MICR reader 107 and depository processors for processing the valuable media substrate validation as discussed herein).

Items are then directed substantially vertically downwards to a point between two nip rollers 108. These nip rollers cooperate and are rotated in opposite directions with respect to each other to either draw deposited checks and/or banknotes inwards (and urge those checks and/or banknotes towards the right hand side in the FIG. 1A), or during another mode of operation, the rollers can be rotated in an opposite fashion to direct processed checks and/or banknotes downwards in the direction shown by arrow A in the FIG. 1A into a check or banknote bin 110. Incoming checks and/or banknotes, which are moved by the nip rollers 108 towards the right, enter a diverter mechanism 120. The diverter mechanism 120 can either divert the incoming checks and/or banknotes upwards (in the FIG. 1A) into a re-buncher unit 125, or downwards in the direction of arrow B in the FIG. 1A into a cash bin 130, or to the right hand side shown in the FIG. 1A into an escrow 140. Items of media from the escrow 140 can selectively be removed from the drum and re-processed after temporary storage. This results in items of media moving from the escrow 140 towards the left hand side of the FIG. 1A where again they will enter the diverter mechanism 120. The diverter mechanism 120 can be utilized to allow the transported checks (a type of valuable media/document) and/or banknotes (another type of valuable media/document) to move substantially unimpeded towards the left hand side and thus the nip rollers 108 or upwards towards the re-buncher 125. Currency notes from the escrow can be directed to the re-buncher 125 or downwards into the banknote bin 130.

As used herein, the phrase "valuable media" refers to media of value, such as currency, coupons, checks, negotiable instruments, value tickets, and the like.

For purposes of the discussions that follow with respect to the FIGS. 1A-1H and 2-4, "valuable media" is referred to as: currency, currency note, banknote, and/or check; and the "valuable media depository" is referred to as a "depository." Additionally, valuable media may be referred to as a "document" and/or "media document" herein. Thus, the terms "note," "media item," "banknote," "currency note," "check," and "document" may be used interchangeably and synonymously herein.

Figure 1B:
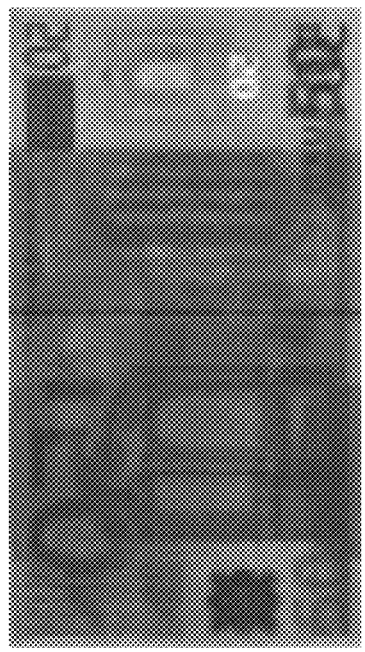
FIG. 1B depicts transmissive images of both a genuine banknote and an imitation (counterfeit) banknote, according to an example embodiment.
Figure 1B:
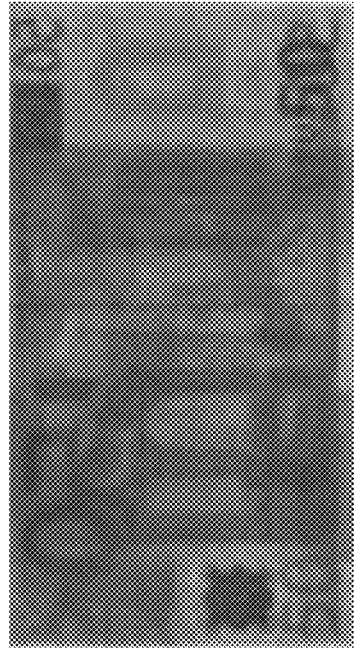

FIG. 1B depicts transmissive images of both a genuine banknote and an imitation (counterfeit) banknote, according to an example embodiment.

The genuine banknote image is depicted on the left and the counterfeit banknote on the right of the FIG. 1B. The banknote depicted is a 50 Euro denomination.

It is noted that it may be possible to closely examine specific features of the two banknotes, so as to manually outline the location of the watermark and specifically examine the data in that area via a transmission (see through) image. However, such an approach has the drawback of being contrary to the massive advantage of a holistic and fully automatic approach to the banknote examination. Furthermore, the watermark area degrades with soiling and graffiti, and other surface effects, which makes such an approach inferior to the approaches discussed herein.

Yet, conventional holistic approaches rely mostly on transmissive images of the banknote. As depicted in FIG. 1B, a transmissive image contains all the details of the two sides of a note, besides the optical response of its substrate. Thus, the signal of the substrate is submerged by the rich information of two-sided printing details. This makes validation function difficult to distinguish counterfeits with missing substrate features from genuine notes showing variations caused by circulation. The direct outcome of the current approaches is the ability to detect a decent number of genuine notes but far too many genuine circulated notes (with surface debris, damage, normal wear and tear) are also rejected, which negatively impacts user experience and creates unnecessary administrative processes/procedures needed to remedy on behalf of the user.

Figure 1C:
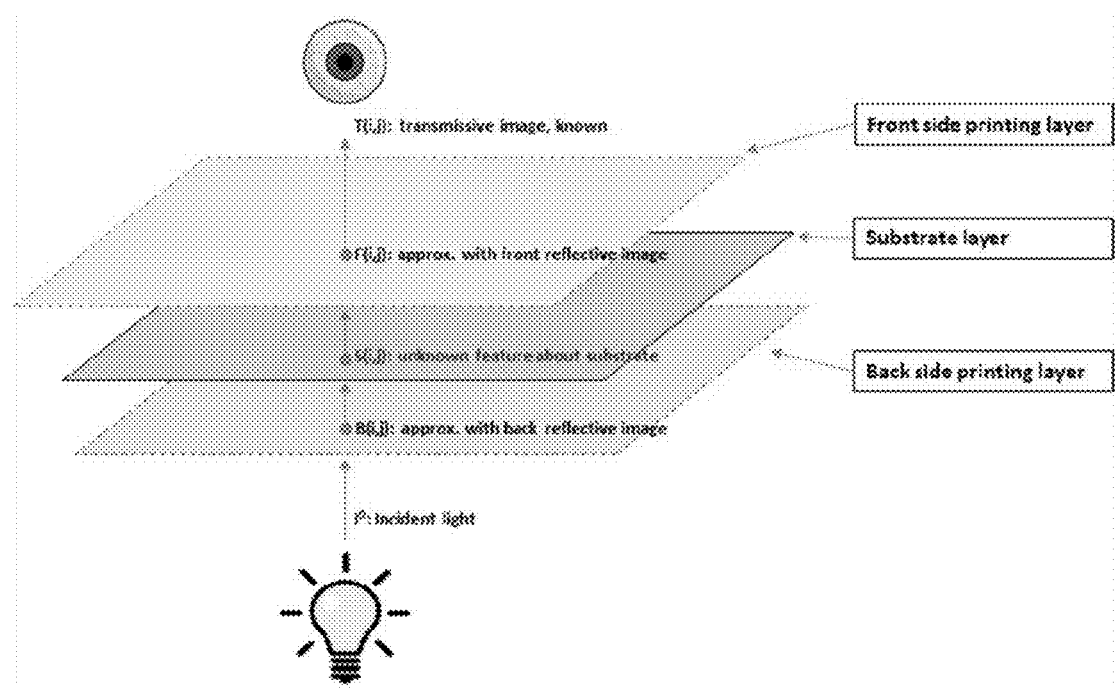
FIG. 1C is a diagram depicting imaged layers and surfaces of a valuable media item that are captured and processed for valuable media substrate validation, according to an example embodiment.

FIG. 1C is a diagram depicting imaged layers and surfaces of a valuable media item that are captured and processed for valuable media substrate validation, according to an example embodiment.

The techniques presented here describe a novel "sandwich model" that formulates a media item's light path, then extracts and validates the media item's substrate responses, which are derived from multilayer Fresnel equations.

As depicted in the FIG. 1C, a media item is represented in a three-layer sandwich model by following the track of transmissive light. The three-layers of the sandwich module are formulated as the: 1) reverse side printing layer, 2) substrate layer in the middle, and 3) front side printing layer from the media item.

Next, the substrate signals are extracted using a multilayer transmission law. According to the lay of multilayer optical transmission, the sensed transmissive image in the last processing step of the three-layer sandwich module, T(i, j) in FIG. 1C is:

$$T(i,j) = I^0 * B(i,j) * S(i,j) * F(i,j) \qquad \text{(equation \#1)}$$

Where $I^0$ is incident light which can be treated as a uniform factor because of the existence of brightness calibration process, B(i, j), S(i, j), F(i, j) are transmission coefficients of the reverse side layer, the substrate layer, and the front side layer.

The optical transmissive coefficients of the reverse side layer and the front side layer can be approximated as a linear relationship with the reflective coefficients (sensed in reflective images):

$$B(i,j) = \rho_1 * B_{reflect}(i,j) \qquad \text{(equation \#2)}$$

$$F(i,j) = \rho_2 * F_{reflect}(i,j) \qquad \text{(equation \#3)}$$

Equations #2 and #3 are plugged into equation #1 to obtain:

$$S(i,j) = T(i,j) / [I^0 * \rho_1 * \rho_2 * B_{reflect}(i,j) * F_{reflect}(i,j)] \qquad \text{(equation \#4)}$$

Set $S'(i,j) = S(i,j) * I^0 * \rho_1 * \rho_2$, deriving:

$$S'(i,j) = T(i,j) / [B_{reflect}(I,j) * F_{reflect}(i,j)] \qquad \text{(equation \#5)}.$$

Equation #5 describes the relationship between substrate responses S' and transmissive image T, front side reflect image $F_{reflect}$, and reverse side reflective image $B_{reflect}$.

Equation 5 is used for extracting latent substrate responses.

The processing is trained on genuine notes by type (government that backs) and denomination. Features of the genuine substrate are then noted for each type of government-backed note and for each denomination. In an embodiment, a number of genuine notes per denomination are processed during a training session.

These model features (captured and noted during training or initial configuration) are used for comparison against a particular note being validated within the depository 100 by developing a feature set or model for the training associated with the genuine notes. Comparison can be done through a variety of approaches, such as a scoring mechanism where the dynamically extracted substrate features for a note being processed through the depository 100 are scored and the scores compared against a model for that type of government-backed note and that denomination. The difference in the score of any note being processed from the model/expected score can then be compared to a threshold range for making an automated decision as to whether the note being processed is genuine or counterfeit.

In an embodiment, the processing is performed in a document or media validation module of the depository 100 (on one or more hardware processors), which receives as input the images captured by the cameras or imaging sensors 106 and 107.

Figure 1D:
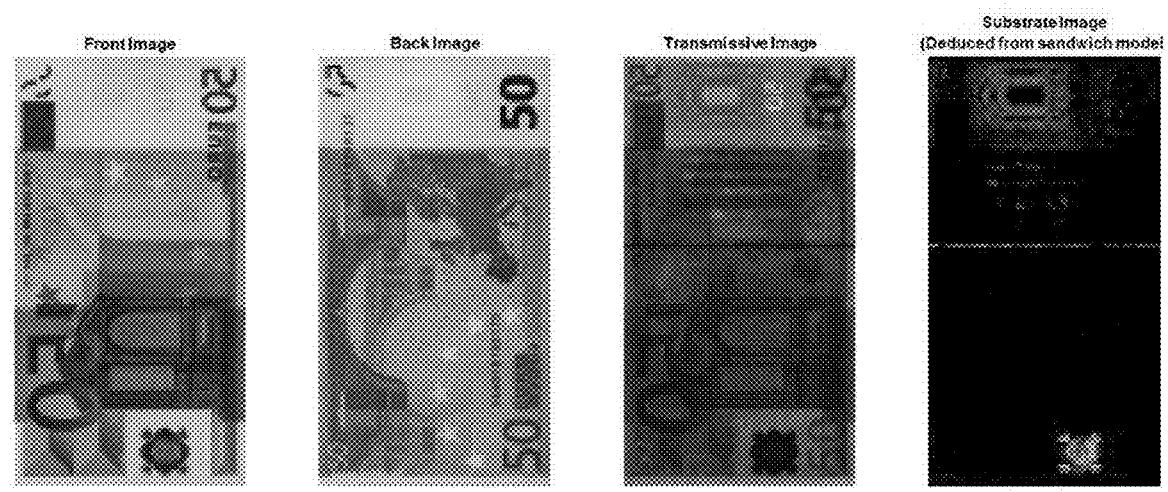
FIG. 1D depicts images captured for the layers and surfaces of a genuine banknote along with a deduced/derived image from the layers and surfaces, according to an example embodiment.

FIG. 1D depicts images captured for the layers and surfaces of a genuine banknote along with a deduced/derived image from the layers and surfaces, according to an example embodiment.

Figure 1E:
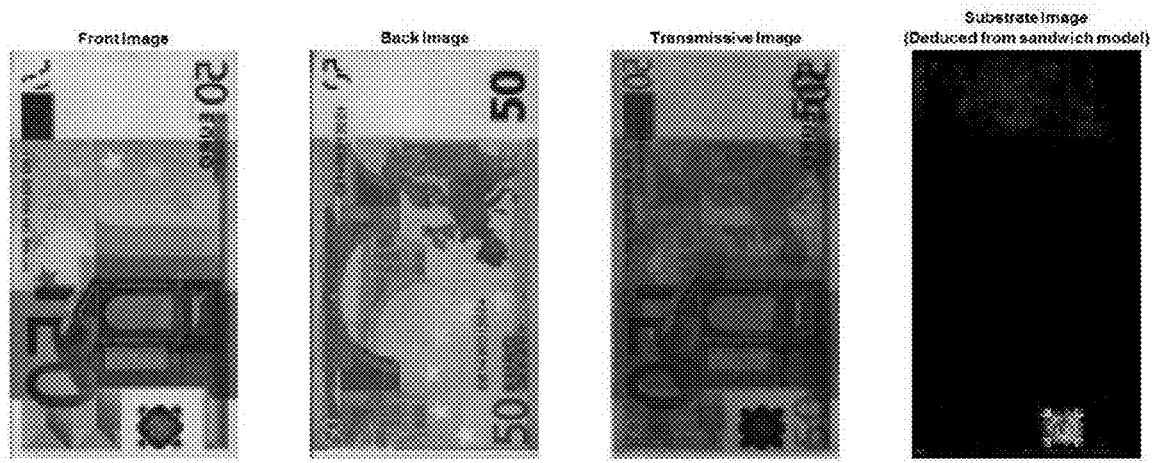
FIG. 1E depicts images captured for the layers and surfaces of an imitation (counterfeit) banknote along with a deduced/derived image from the layers and surfaces, according to an example embodiment.
Figure 1F:
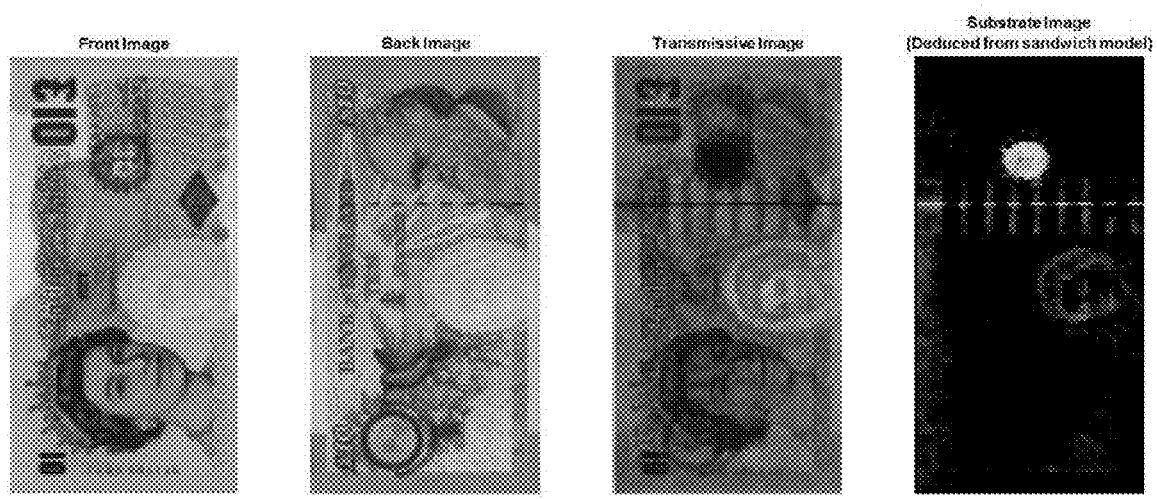
FIG. 1F depicts images captured for the layers and surfaces of a different genuine banknote along with a deduced/derived image from the layers and surfaces, according to an example embodiment.
Figure 1G:
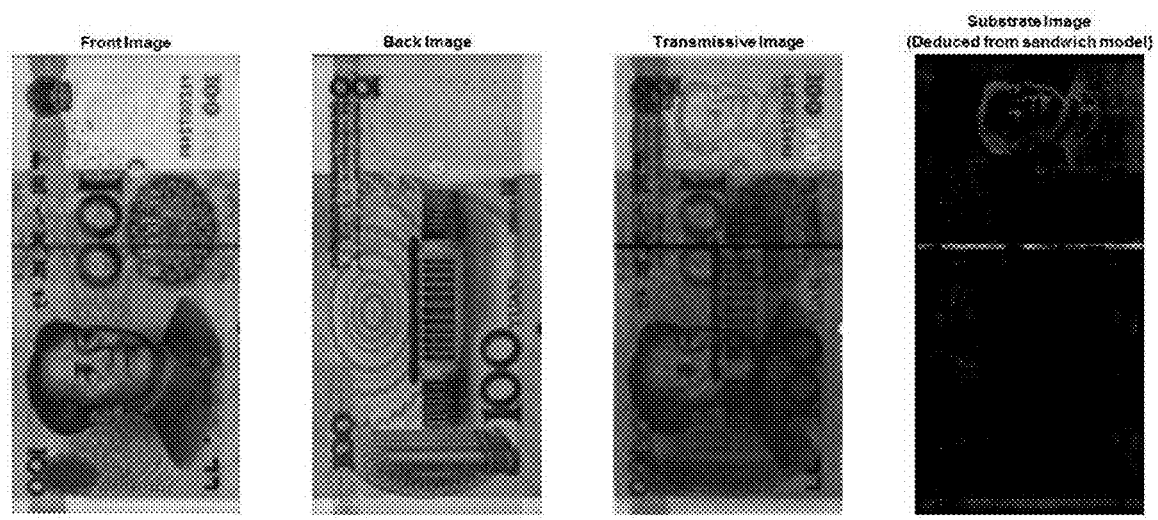
FIG. 1G depicts images captured for the layers and surfaces of another genuine banknote along with a deduced/derived image from the layers and surfaces, according to an example embodiment.

The FIGS. 1D and 1E illustrate the resulting images of a genuine and a counterfeit €50 (counterfeit shown in the FIG. 1E), whose substrate responses clearly reveal the watermark region, the metallic thread, and the foil patch. More examples of applying the method to other currencies are shown in FIGS. 1F (for a genuine Bank of England banknote) and 1G (for a counterfeit Bank of China banknote); these examples demonstrate that the sandwich processing validation approach is generic and can be processed for media item validation independent of the type of government-backed currency note or media denomination being validated.

The presented techniques for media item validation can also be integrated within and processed over communication channels other than a depository 100.

Furthermore, validation of the substrate features of a media item techniques reduces false counterfeit determinations by media validation modules and provides a holistic approach to media item validation. This is achieved in a processing efficient manner on the media item validation processors and provides improved security in determining genuine media items from counterfeit media items (even with the enhanced printing quality of counterfeits available in the industry).

Additionally, the processing described above can be added to existing media validation processing available in the industry as an enhancement for substrate validation during media item validation, such that existing media validation techniques can still be processed when determining whether a media item is genuine or counterfeit.

The media item substrate validation techniques achieves what has heretofore alluded the industry, which is media item substrate validation. The techniques are directed to validation substrate features of the media item through a three-layer sandwich approach that derives the substrate features from front side image features and reverse side image features. The approach can be processed with existing imaging equipment (sensors, cameras, processors, etc.) as an added validation process to combat high print quality of counterfeits being detected in the industry. Furthermore, the processing workflow is easily integrated into existing media validation processes using existing media validation hardware and software.

The acceptance rate of genuine notes is increased reducing false positives in the industry while high print quality counterfeits are consistently rejected as counterfeits. The approach is generic and is not dependent on a particular government's currency or a particular denomination of a currency.

FIG. 1H depicts a table of results for testing the valuable media substrate validation techniques, according to an example embodiment.

Testing was performed to verify the effectiveness of the sandwich model for media item substrate validation. The testing was performed on €50 notes where the counterfeits were of bank-made high quality samples.

The column labeled "Original DVM" refers to the obtained test results on an existing document validation module (DVM), which was not enhanced to perform the media substrate validation processing discussed herein. The column labeled "DVM with solution" refers to the same DVM that was enhanced to perform the media substrate validation processing discussed herein.

The asterisk (*) in row A under the Metric column for the Counterfeit category means that the output of the validation testing included three categories: genuine, suspect, and counterfeit.

It can be seen that distinct increases in genuine acceptance rate are achieved. More significant, the separation between genuine note response and counterfeit note response are increased, which means one can expect to see steady rejection of those high-quality imitations.

In an embodiment, the depository 100 is integrated into a SST. In an embodiment, the SST is an ATM. In an embodiment, the ATM is a kiosk.

In an embodiment, the depository 100 is integrated into a Point-Of-Sale (POS) terminal.

These and other embodiments are now discussed with reference to the FIGS. 2-4.

Figure 2:
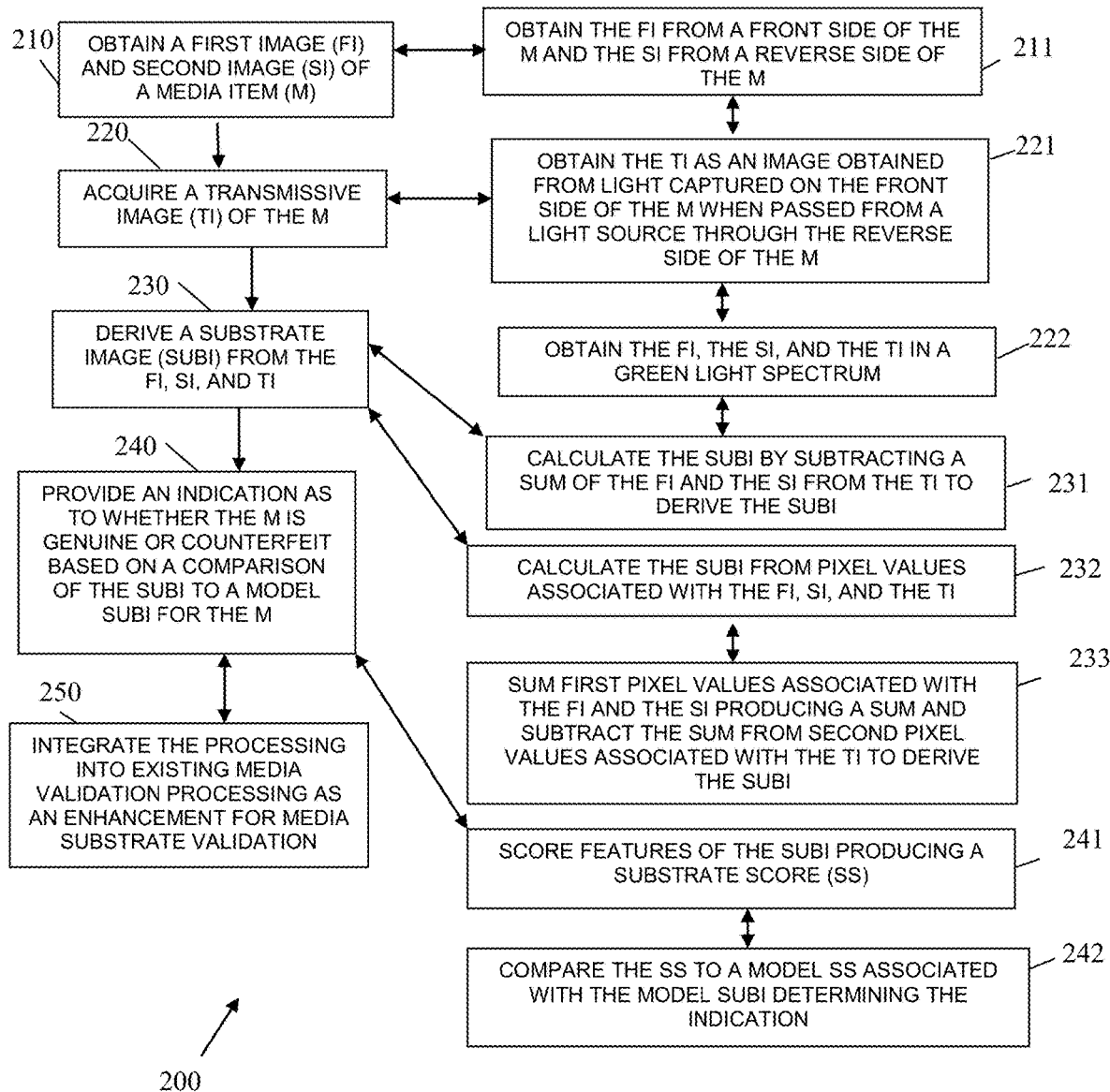
FIG. 2 is a diagram of a method for valuable media substrate validation, according to an example embodiment.

FIG. 2 is a diagram of a method 200 for valuable media substrate validation, according to an example embodiment. The method 200 when processed provides an indication to the valuable media handing device as to whether a media item is genuine and/fit for acceptance and further processing within the valuable media handling device during a transaction. The method 200 is implemented as executable instructions representing one or more firmware/software modules referred to as a "media item substrate validator." The instructions reside in a non-transitory computer-readable medium and are executed by one or more processors of the valuable media depository.

In an embodiment, the media item substrate validator is processed within the valuable media depository/dispenser. In an embodiment, the media item substrate validator processes within a media validation module (device) or a document validation module (device—DVM) that is integrated into the valuable media depository/dispenser. In an embodiment, the valuable media depository/dispenser is the depository 100.

In an embodiment, the valuable media depository/dispenser is a peripheral device integrated into a Self-Service Terminal (SST). In an embodiment, the SST is an ATM. In an embodiment, the SST is a kiosk.

In an embodiment, the valuable media depository/dispenser is a peripheral device integrated into a Point-Of-Sale (POS) terminal operated by a clerk.

In an embodiment, the media item substrate validator performs, inter alia, the processing discussed above with the FIGS. 1A-1H. In an embodiment, the media item substrate validator is an enhancement to an existing media validation process for use with valuable media as an enhancement for performing media substrate validation on the valuable media.

At 210, the media item substrate validator, obtain a first image and second image of a media item being processed and urged through a valuable media depository.

In an embodiment, at 211, the media item substrate validator obtains the first image from a front side of the media item and the second image from a reverse side of the media item. Illustration of these three images and discussion related thereto was provided in the FIG. 1C above.

At 220, the media item substrate validator acquires a transmissive image of the media item. This too was illustrated in the FIG. 1C above.

In an embodiment of 211 and 220, at 221, the media item substrate validator obtains the transmissive image as an image obtained from light captured on the front side of the media item when passed from a light source illuminated through the reverse side of the media item.

In an embodiment of 221, at 222, the media item substrate validator obtain the first image, the second image, and the transmissive image in a green light spectrum.

At 230, the media item substrate validator derives a substrate image from the first image, the second image, and the transmissive image. This is a calculated image and is not one that is capture by a camera or an imaging sensor.

In an embodiment of 222 and 230, at 231, the media item substrate validator calculates the substrate image by subtracting a sum of the first image and the second image from the transmissive image to derive the substrate image.

In an embodiment, at 232, the media item substrate validator calculates the substrate image from pixel values associated with the first image, the second image, and the transmissive image.

In an embodiment of 232 and at 233, the media item substrate validator sums the first pixel values associated with the first image and the second image producing a sum and subtract the sub from the second pixel values associated with the transmissive image to derive the substrate image.

At 240, the media item substrate validator provide an indication as to whether the media item is genuine or counterfeit based on a comparison of the substrate image to a model substrate image for the media item.

In an embodiment, at 241, the media item substrate validator scores features of the substrate image producing a substrate score.

In an embodiment of 241 and at 242, the media item substrate validator compares the substrate score to a model substrate score associated with the model substrate determining the indication.

According to an embodiment, the media item substrate validator is integrated within existing media validation processing as an enhancement for media substrate validation. That is, the media item substrate validator performs additional media validation against the actual substrate of the media item as an extended validation process.

Figure 3:
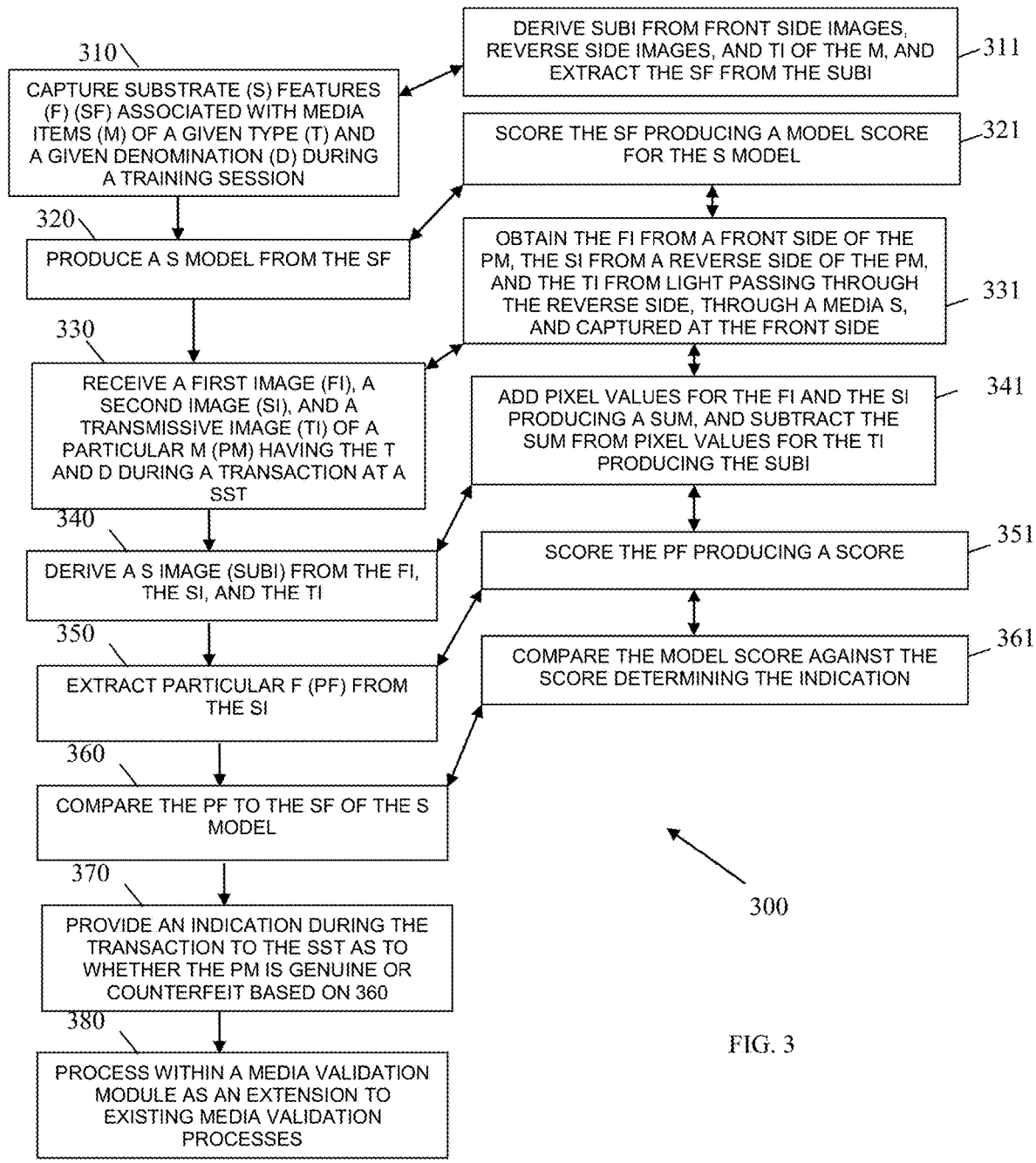
FIG. 3 is a diagram of another method for valuable media substrate validation, according to an example embodiment.

FIG. 3 is a diagram of another method 300 for valuable media substrate validation, according to an example embodiment. The method 300 when processed controls operation for a media validation module (peripheral device) integrated into a valuable media depository/dispenser. The method 200 is implemented as executable instructions representing one or more firmware/software modules referred to as a "note substrate validator." The instructions reside in a non-transitory computer-readable medium and are executed by one or more processors of the valuable media depository.

In an embodiment, the valuable media depository/dispenser is the depository 100.

In an embodiment, the valuable media depository/dispenser is a peripheral device integrated into a Self-Service Terminal (SST). In an embodiment, the SST is an ATM. In an embodiment, the SST is a kiosk.

In an embodiment, the valuable media depository/dispenser is a peripheral device integrated into a Point-Of-Sale (POS) terminal operated by a clerk.

In an embodiment, the note substrate validator performs all or some combination of the processing discussed above with the FIGS. 1A-1H and 2.

In an embodiment, the note substrate validator is executed as firmware/software programmed instructions in memory of a media validation peripheral device or a depository/dispenser.

In an embodiment, the note substrate validator presents another and in some ways an enhanced processing perspective from that which was described with the method 200 and the FIG. 2.

At 310, the note substrate validator captures substrate features associated with media items of a given type (particular government) and a given denomination during a training or configuration session.

In an embodiment, at 311, the note substrate validator derives substrate images for substrates of the media items used during the training session using front side images, reverse side images, and transmissive images. The note substrate validator extracts the substrate features from the derived substrate images.

At 320, the note substrate validator produces a model from the substrate features.

In an embodiment of 311 and 320, at 321, the note substrate validator scores the substrate features producing a model score for the substrate model.

At 330, the note substrate validator receives a first image, a second image, and a transmissive image of a particular media item having the given type and the given denomination (used in the training session at 310) during a transaction at a SST where the particular media item is processed or urged through the SST for the transaction.

In an embodiment of 321 and 330, at 331, the note substrate validator obtains the first image from a front side of the particular media item, the second image from a reverse side of the particular media item, and the transmissive item from light passing through the reverse side, through a media substrate of the particular media item, and captured at the front side of the particular media item.

At 340, the note substrate validator derives a substrate image from the first image, the second image, and the transmissive image.

In an embodiment of 331 and 340, at 341, the note substrate validator adds pixel values for the first image and the second image together producing a sum and the sub is subtracted from pixel values for the transmissive image producing the substrate image for the particular media item.

At 350, the note substrate validator extracts particular features from the substrate image. The type of features extracted corresponding and are the same as the type of features extracted during the training session at 310.

In an embodiment of 341 and 350, at 351, the note substrate validator scores the particular features of the particular media item producing a score.

At 360, the note substrate validator compares the particular features to the substrate features of the substrate model.

In an embodiment of 351 and 360, at 361, the note substrate validator compares the model score (from 321) against the score (from 351) determining the indication (determining a value as to whether the particular media item is genuine or counterfeit). It is noted that the indication does not have to be a binary value (although it can be in some embodiments); rather, in some embodiments, the indication can be a percentage based on the processing representing a confidence that the media item is genuine or counterfeit. It is further noted that the indication can be one factor used by the validation module in determining whether to accept the particular media item as genuine or reject the particular media item as counterfeit. That is, other existing validation processes within the validation module can use the value associated with the indication with other values determined by those existing validation processes to make a final decision as to whether to accept the particular media item for the transaction or reject the particular media for the transaction.

At 370, the note substrate validator provides the indication during the transaction to the SST as to whether the particular media item is genuine or counterfeit based on the compare processing at 360.

According to an embodiment, at 380, the note substrate validator processes with a media/document validation module (DVM) as an extension and an enhancement to complement existing media validation processes that execute on the DVM.

Figure 4:
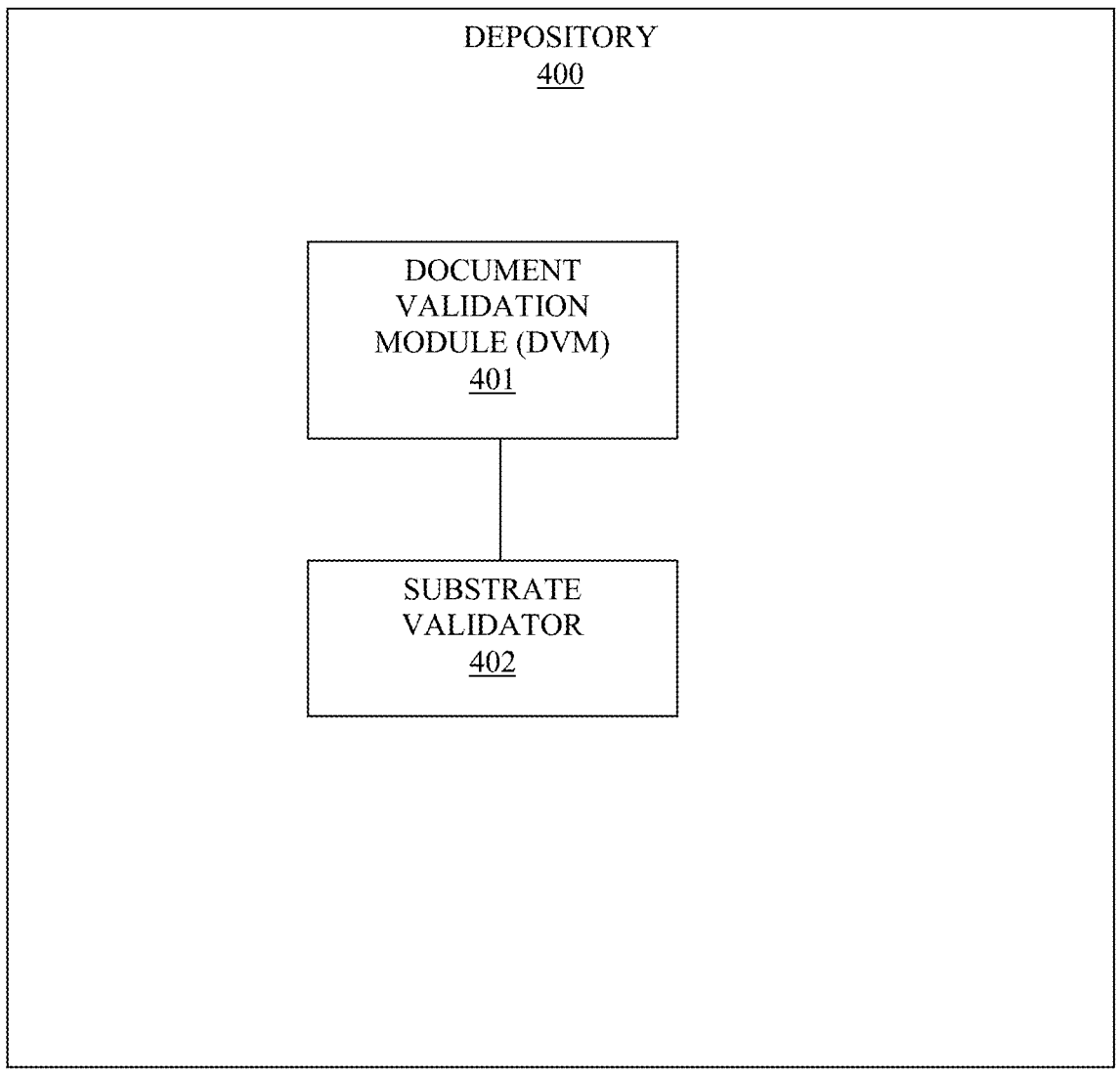
FIG. 4 is a diagram of a valuable media depository, according to an example embodiment.

FIG. 4 is a diagram of a valuable media depository 400, according to an example embodiment. The valuable media depository 400 records and processes image signal readings using a variety of mechanical, electrical, and software/firmware components (such as IR sensors, lighting sources, track pathway, memory, electrical circuitry, processors, etc.), some of which were discussed above with reference to the FIG. 1A.

In an embodiment, the valuable media depository 400 is the depository 100.

In an embodiment, the valuable media depository 400 is integrated within a SST (ATM or kiosk) or a POS terminal.

In an embodiment, the valuable media depository 400 performs, inter alia, all or some combination of the processing discussed above in the FIGS. 1A-1H and 2-3.

The valuable media depository 400 includes a DVM 401 and a substrate validator 402.

The substrate validator 401 is configured and programmed to: i) process on at least one hardware processor of the depository 400 or the DVM 401, ii) produce a model substrate score for substrates of currency notes having a given type and a given denomination, iii) derive a particular substrate score for a particular substrate of a particular media item being processed through the depository 400 for a transaction, and iv) provide an indication to the depository 400 as to whether the particular media item is genuine or counterfeit based on a comparison between the model substrate score and the particular substrate score.

In an embodiment, the substrate validator 401 performs all or some combination of the processing discussed above in the FIGS. 1A-1H and 2-3.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   obtaining a first image of a front-side printing layer for a media item and obtaining a second image of a reverse-side printing layer for of the media item;
   acquiring a transmissive image of the media item;
   deriving a substrate image for a substrate layer of the media item or a substrate of the media item from the first image, the second image, and the transmissive image; and
   providing an indication as to whether the media item is genuine or counterfeit based on a comparison of the substrate image to a model substrate image for the media item.

2. The method of claim 1, wherein obtaining further includes obtaining the first image from a front side of the media item and the second image from a reverse side of the media item.

3. The method of claim 2, wherein acquiring further includes obtaining the transmissive image as an image obtained from light captured on the front side of the media item when passed from a light source through the reverse side of the media item.

4. The method of claim 3, wherein acquiring further includes obtaining the first image, the second image, and the transmissive image in a green light spectrum.

5. The method of claim 4, wherein deriving further includes calculating the substrate image by subtracting a sum of the first image and the second image from the transmissive image to derive the substrate image.

6. The method of claim 1, wherein deriving further includes calculating the substrate image from pixel values associated with the first image, the second image, and the transmissive image.

7. The method of claim 1, wherein calculating further includes summing first pixels values associated with the first image and the second image producing a sum, and subtracting the sum from second pixel values associated with the transmissive image deriving the substrate image.

8. The method of claim 1, wherein providing further includes scoring features extracted from the substrate image producing a substrate score.

9. The method of claim 8, wherein scoring further includes comparing the substrate score to a model substrate score associated with the model substrate image determining the indication.

10. The method of claim 1 further includes integrating the method into existing media validation processes as an enhancement for media substrate validation.

11. A method, comprising:
    capturing substrate features for substrates associated with media items of a given type and a given denomination during a training session;
    producing a substrate model from the substrate features;
    receiving a first image of a front-side printing layer for a particular media item, receiving a second image of a reverse-side printing layer for the particular media item, and receiving a transmissive image of the particular media item, wherein the particular media item comprising having the given type and the given denomination during a transaction at a Self-Service Terminal (SST);

deriving a substrate image for a particular substrate of the particular media item from the first image, the second image, and the transmissive image;

extracting particular features from the substrate image;

comparing the particular features to the substrate features of the substrate model; and providing an indication during the transaction to the SST as to whether the particular media item is genuine or counterfeit based on the comparing.

12. The method of claim 11 further comprising, process the method within a media validation module of the SST as an extension to existing media validation processes.

13. The method of claim 11, wherein capturing further includes deriving substrate images from front side images, reverse side images, and transmissive images of the media items and extracting the substrate features from the substrate images.

14. The method of claim 11, wherein producing further includes scoring the substrate features producing a model score for the substrate model.

15. The method of claim 14, wherein receiving further includes obtaining the first image from a front side of the particular media item, the second image from a reverse side of the particular media item, and the transmissive image from light captured passing through the reverse side of the particular media item, through a media substrate of the particular media item, and captured at the front side.

16. The method of claim 15, wherein deriving further includes adding pixel values for the first image and second image together producing a sum, and subtracting the sum from pixel values for the transmissive image producing the substrate image.

17. The method of claim 16, wherein extracting further includes scoring the particular features producing a score.

18. The method of claim 17, wherein comparing further includes comparing the model score against the score determining the indication.

* * * * *